United States Patent [19]

Duke-Moran et al.

[11] Patent Number: 5,819,259
[45] Date of Patent: Oct. 6, 1998

[54] SEARCHING MEDIA AND TEXT INFORMATION AND CATEGORIZING THE SAME EMPLOYING EXPERT SYSTEM APPARATUS AND METHODS

[75] Inventors: Celia R. Duke-Moran, Windsor Locks, Conn.; Scott Richard Weiner, Foster City, Calif.

[73] Assignee: Hartford Fire Insurance Company, Hartford, Conn.

[21] Appl. No.: 992,428

[22] Filed: Dec. 17, 1992

[51] Int. Cl.[6] .................................................. G06F 15/00
[52] U.S. Cl. .................................................. 707/3; 395/50
[58] Field of Search .............................. 364/419, 419.19, 364/419.1, 419.02; 395/600, 934, 50, 54, 60, 76; 707/3, 7

[56] References Cited

U.S. PATENT DOCUMENTS

| | | | |
|---|---|---|---|
| 3,670,310 | 6/1972 | Bharwani et al. | 340/172.5 |
| 4,318,184 | 3/1982 | Millet et al. | 364/900 |
| 4,554,631 | 11/1985 | Reddington | 364/300 |
| 4,823,306 | 4/1989 | Barbic et al. | 395/600 |
| 4,868,750 | 9/1989 | Kucera et al. | 364/419.19 |
| 4,870,568 | 9/1989 | Kahle et al. | 395/600 |
| 4,943,933 | 7/1990 | Miyamoto et al. | 395/54 |
| 4,970,657 | 11/1990 | Wolf | 395/54 |
| 5,020,019 | 5/1991 | Ogawa | 395/600 |
| 5,025,392 | 6/1991 | Singh | 395/54 |
| 5,212,768 | 5/1993 | Itsuki et al. | 395/54 |
| 5,241,671 | 8/1993 | Reed et al. | 395/600 |
| 5,263,126 | 11/1993 | Chang | 395/54 |
| 5,297,042 | 3/1994 | Morita | 364/419.19 |
| 5,321,833 | 6/1994 | Chang et al. | 395/600 |
| 5,325,465 | 6/1994 | Hung et al. | 395/934 |
| 5,369,763 | 11/1994 | Biles | 395/600 |

*Primary Examiner*—Jack B. Harvey
*Assistant Examiner*—X. Chung-Trans
*Attorney, Agent, or Firm*—Plevy & Associates

[57] ABSTRACT

An expert system apparatus employs a rule base and a knowledge base to perform media searching. The rule base is specified by means of a series of selected keywords and phrases which are entered in by a user. The phrases are further selected in conjunction with a General Information display enabling the user to select various phrases concerning a series of newspaper articles or media articles which are placed in the knowledge base of the system. By selecting topics such as article type, individual age level, focus of the article and topics of the article a user can then develop a rule base to enable the inference engine implemented by a computer to search the knowledge base and select those articles which are associated with the particular phrases which are indicated and selected by the user. Each phrase or keyword detected will cause tag words to be provided to further provide categories for the processed article. The system processed information from news articles or media pertaining to topics relating to the handicapped. This information is extremely useful for insurance companies and other institutions as well.

15 Claims, 6 Drawing Sheets

FIG. 7

GENERAL INFORMATION

TYPE 70
- ☐ EDITORIAL/OPINION
- ☐ STRAIGHT NEWS
- ☐ FEATURED STORIES/INDIVIDUALS
- ☐ FEATURED STORIES/ORGANIZATIONS

AGE LEVEL 71
- ☐ INFANT/PRESCHOOL
- ☐ STUDENTS-ELEMENTARY
- ☐ STUDENTS-SECONDARY
- ☐ STUDENTS-COLLEGE
- ☐ STUDENTS-NOT SPECIFIED
- ☐ STUDENTS-ALL AGE LEVELS
- ☐ ADULTS (OVER 21)
- ☐ SENIOR CITIZENS (OVER 65)
- ☐ ALL AGE LEVELS

FOCUS OF ARTICLE 72
- ☐ AUDITORIALLY IMPAIRED
- ☐ DEAF/BLIND
- ☐ EMOTIONALLY DISTURBED
- ☐ LEARNING DISABLED
- ☐ MENTALLY RETARDED
- ☐ ORTHOPEDICALLY HANDICAPPED
- ☐ OTHER HEALTH IMPAIRED
- ☐ VISUALLY IMPAIRED
- ☐ HANDICAPPED-NOT SPECIFIED
- ☐ ALL HANDICAPS STATED
- ☐ PARENTS OF HANDICAPPED PERSONS
- ☐ NON-HANDICAPPED

TOPICS OF ARTICLES 73
- ☐ ACCESSIBILITY TO AND WITHIN BUILDINGS
- ☐ ACCESSIBILITY TO TRANSPORTATION
- ☐ ADVERTISING
- ☐ AIDS AND THE HANDICAPPED
- ☐ ART/PERFORMING ARTS
- ☐ BUDGET EXPENDITURES/TAXES
- ☐ CRIMES COMMITTED BY HANDICAPPED
- ☐ CRIMES COMMITTED AGAINST HANDICAPPED
- ☐ EDUCATING NON-HANDICAPPED ABOUT HANDICAPPED
- ☐ EMPLOYMENT OF HANDICAPPED
- ☐ FOSTER/CARE ADOPTION
- ☐ HOUSING FOR THE HANDICAPPED
- ☐ INSTRUCTION IN PRIVATE SCHOOLS
- ☐ INSTRUCTION IN PRIVATE SCHOOLS e.g. METHODS
- ☐ MAINSTREAMING OF HANDICAPPED STUDENTS IN SCHOOLS
- ☐ MEDICAL ADVANCES FOR HANDICAPPED
- ☐ NORMALIZATION OF THE HANDICAPPED e.g. COMMUNITY PROGRAMS
- ☐ PARENT COUNSELING OR PARENT SUPPORT GROUPS/PROGRAMS
- ☐ PERSONAL STORY ABOUT OVERCOMING EFFECTS OF HANDICAP
- ☐ PHILANTHROPY
- ☐ POLICY MAKING THROUGH LEGISLATION OF COURT DECISION
- ☐ PRE-NATAL PROGRAMS INCLUDING GENETIC COUNSELING
- ☐ PRE-SCHOOL PROGRAMS FOR THE HANDICAPPED
- ☐ P.L. 94-142 COMPLIANCE WITH
- ☐ RECREATION
- ☐ SPORTS FOR THE HANDICAPPED
- ☐ TECHNOLOGY AND THE HANDICAPPED
- ☐ TREATMENT IN INSTITUTIONS FOR THE HANDICAPPED
- ☐ VOCATIONAL REHABILITATION
- ☐ WELFARE BENEFITS FOR THE HANDICAPPED

74
- UNSELECT ALL
- SELECT ALL

76

FILE STATISTICS 75
- SHOW ALL
- SHOW UNION 77
- SHOW INTERSECTION

78

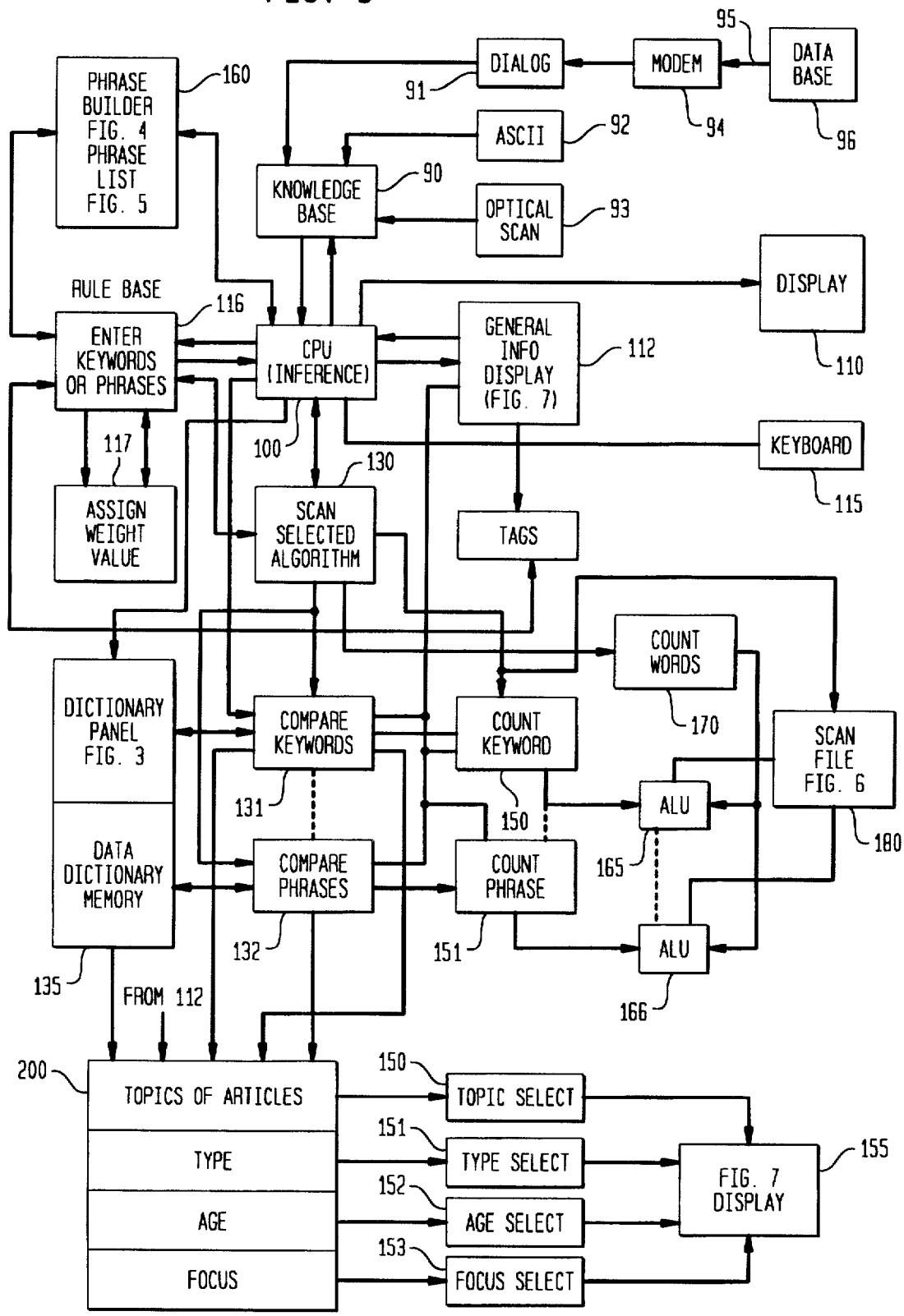

SEARCHING MEDIA AND TEXT INFORMATION AND CATEGORIZING THE SAME EMPLOYING EXPERT SYSTEM APPARATUS AND METHODS

FIELD OF THE INVENTION

This invention relates to expert system apparatus in general and more particularly to an expert system which is capable of searching media and text information such as newspaper items and placing the same into predetermined categories.

BACKGROUND OF THE INVENTION

The term 'expert system refers to a system that uses contemporary computer technology to store and interpret the knowledge and experience of a human expert, sometime several experts, in a specific field of interest. By accessing the computer based knowledge an individual is able to get benefit of "expert advice" about a particular area. In any event, a good expert system contains qualitative, nontrivial, and high quality knowledge for the solution of difficult problems in a relatively narrow domain. From the software point of view, the basic components of an expert system are the knowledge base, the database and inference engine.

A more advanced expert system may include software support to facilitate knowledge base maintenance, knowledge acquisition, language interface, and algorithm interface, etc. Machine learning capabilities are desirable but uncommon features. As one can ascertain, the expert system as a branch of artificial intelligence is a widely investigated area and such systems have been in existence for many years.

The expert system has been employed in a wide variety of applications. See for example U.S. Pat. No. 4,999,833 issued on Mar. 12, 1991 entitled *Network Connectivity Control By Artificial Intelligence* issued to W. C. Lee and assigned to ITT Corporation the assignee herein. In that system, a communication system utilizes artificial intelligence to select connectivity paths among various locations in a network. See U.S. Pat. No. 5,023,785 issued on Jun. 1, 1991 entitled *Hematology-Diagnosis Apparatus Employing Expert System Technology* by R. F. Adrion et al. assigned to Beckton and Dickinson Company. That patent describes a hematology diagnosis apparatus employing expert system technology. See also a text entitled *Principles of Expert Systems* edited by A. Gupta et al., and published by IEEE Press (1988). This text describes various expert systems and has an extensive bibliography and subject index concerning such systems.

For present purposes it is well understood that expert systems have been widely employed in the prior art. In any event, in today's modern world there is a great need to correlate and obtain up-to-date information concerning various topics as well as relationships and characteristics between topics and society. The amount of information generated each day by newspapers and periodicals throughout this country alone is massive. The information is extremely pertinent to various industries, such as the insurance industry, to determine cause of death, accidents, disease, age groups and involves a host of other situations. Other industries would be interested in other areas as one can understand. Suffice it to say that the information generated by newspapers, periodicals and the like if categorized easily and if accessible could be immensely valuable. As one can readily ascertain, it is important for an insurance company to evaluate the risks associated with various individuals in various age groups. An insurance company may wish to know the habits, health conditions, accident occurrences, of particular individuals in certain age groups such as teenagers, senior citizens and so on.

As indicated in today's society, newspapers as well as the various periodicals, contain huge amounts of information. In a newspaper, the obituary column indicates deaths, age and usually causes of death. Apart from the obituary column there are literally thousands of articles regarding accidents, sicknesses and so on. Such periodicals and newspapers contain a wealth of information which would be desirable for an insurance company to access.

Various researchers in the past analyzed samples of articles from selected national newspapers to investigate reporters/editors coverage of persons with disabilities. See, for example, an article by R. Yoshida, L. Wasilewski and D. L. Friedman (1990) entitled Recent Newspaper Coverage About Persons With Disability published in *Exceptional Children* 56 (5), pages 418 to 423. By employing a traditional search procedure of manually reading and coding articles into categories Yoshida et al. concluded that these national newspaper reporters and editors are contributing to a public that is not fully informed about the disabled. They concluded that some, but not all, of the more socially and professionally relevant issues, concerns and program aspects of special education were covered.

In any event, as one can ascertain, the amount of information which is disseminated by newspapers and periodicals on a daily basis is huge.

Is it is, therefore, an object of the present invention to employ electronic information retrieval to be used in combination with an expert system that will code such articles and text information disseminated by media into desirable issue categories.

Essentially, the system to be described will be employed in correlating electronically obtained media/text information relating to issues involving public attitude, and wherein such techniques can be utilized by many commercial enterprises to perform survey studies, actuarial studies for the insurance, travel, financial industries and so on.

SUMMARY OF THE INVENTION

A method for searching media articles such as newspaper articles for reviewing the information content in said articles and for categorizing the subject matter according to predetermined topics, comprising the steps of: storing said articles in a database, selecting anyone of said articles for processing, entering keywords in a memory which relate to desired criteria to be searched in said article according to said topics, assigning a weighting factor to each of said keywords, scanning said articles for said keywords, providing a score of keywords found as effected by said weighting factor, selecting said articles having the greatest scores as those indicative of said desired criteria.

BRIEF DESCRIPTION OF FIGURES

FIG. 7 is a display presentation showing General Information where article topics are selected for use in the expert system according to this invention.

FIG. 9 is a detailed block diagram showing the expert system according to this invention.

DETAILED DESCRIPTION OF INVENTION

Before discussing this invention in detail it is indicated that the expert system to be described will be primarily concerned with correlating media/text information to determine, for example, public attitude regarding, disabilities of various persons in various groups and matters such as that. The discussion will rely mainly on the use of an expert system to investigate newspaper and periodical coverage of persons in various groups such as those with disabilities and utilizing the expert system as a effective search and categorizing tool.

Figure 1:
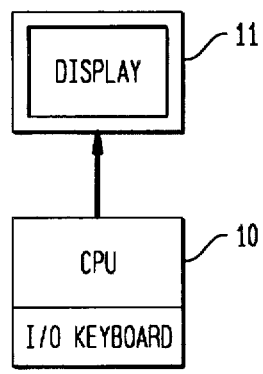
FIG. 1 is a block diagram of a computer or data processor apparatus which can be used in implementing the expert system according to the present invention.

Referring to FIG. 1 there is shown a simple block diagram of a typical computer system, which essentially can operate as a expert system as will be further explained. The computer 10 is designated as a CPU, but is in fact capable of analyzing large amounts of data in a semi-cognitive fashion. For example, such a computer is the NeXTstep 3.0 manufactured by the NeXT Computer, Inc. of California and such computers are available from many other sources.

The CPU 10 is associated with an input output I/O device including a keyboard or various other access means to interface with the outside world. Associated with the computer is a display 11, which may be a CRT or other type of display. As one can ascertain, the CPU 10 may include a printer or other means of developing hard copy from data generated. Most computers such as the CPU 10 are equipped with a keyboard a memory storage device such as floppy disks, tape, CD ROM, RAM and so on. The floppy disk or the hard disk of the computer can operate and serve as the knowledge base of the expert system. As will be explained, the computer will process information from news articles pertaining to topics dealing with the disabled or the handicapped.

This type of information is extremely interesting and useful to insurance companies. The expert system operates to analyze an article and place it into a category based on a predefined set of rules of logic and topic headings. The application to be described may be employed further as a testing model to reinforce the basic beliefs that through such an expert system increased researching efficiency can be employed. In any event, as will be further explained, adults in our democratic society obtain most of their information and perceptions about those with disabilities through major media sources. The insurance company is particularly concerned with such disabilities as affecting rates and coverage and so on.

There have been many studies conducted using traditional research procedures to examine coverage of disability based on the various media. As indicated above, the Yoshida et al. survey read a sample of articles from selected national newspapers to investigate coverage of persons with disabilities. It was concluded that only three of the more socially and professionally relevant issues of special education were covered with frequency; budget expenditures, housing and institutional treatment. It is obvious that the labor intensity of the above study was extremely difficult and essentially the study was limited to five newspaper indexes.

The geographical distribution choices were made on the basis of which newspaper indexes were available in print for predetermined periods of time. In that investigation, the indexes of the newspapers were scanned for a period of a year and selected articles were obtained on the basis of keywords. The resulting pool included 540 titles. Yoshida et al. took a 15% random sample of the articles and three people read and manually coded the articles into thirty predetermined categories based on their own judgements. In any event, the major concern is the small population of articles and the limited sampling used in such studies. The sample consisted of 188 articles as a representation from five selected newspapers.

Thus, the sample was not made large enough to make conclusions about the 540 articles with any great degree of certainty. In any event, while computers have aided and assisted in the searching process and have made it possible to obtain and improve retrieval capacity which transcends the individual researchers capability to obtain information they still have to be programmed and designed in a manner that the information obtained is suitable for the present purposes. Electronic information retrieval provides virtually unlimited access to information even when geographically dispersed, and it is usually available within 24 hours of publication.

As one can also ascertain, every major subject and significant publications are collected in computer databases and made available on-line through services such as DIALOG, Mead or IAC. Such services contain databases of thousands of bibliographic, abstract, textual and numeric information. In any event, while the databases exist there has to be some economical and convenient way of utilizing present computer techniques to search such bases and to obtain the desired information. The databases discussed are extremely large. Today a database such as DIALOG allows immediate access to days, weeks, months, even years of news coverage on particular topics. DIALOG in particular has powerful search capabilities allowing, for example, keyword search in context and viewing search terms in context DIALOG provides full text coverage of over 180 newspapers.

Figure 2:
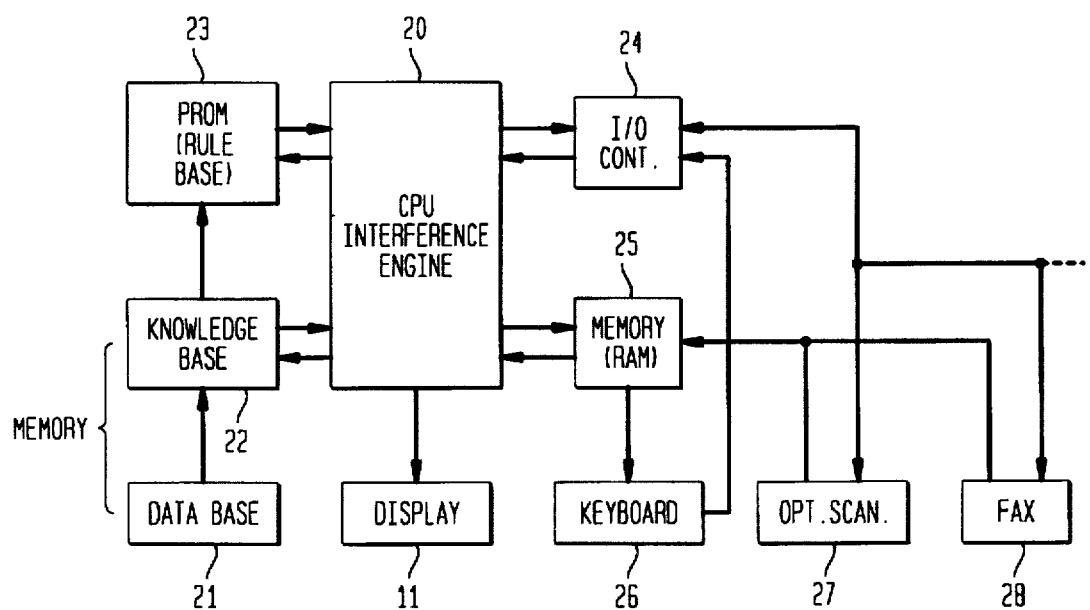
FIG. 2 is a block diagram in greater detail of an artificial intelligence system operating in conjunction with this invention.

The present invention utilizes the expert system to scan, categorize and otherwise review all such data in a database as the DIALOG database and to continuously categorize the data which, in this example, an insurance company user is concerned with. The use of an expert system, as indicated above, which mirrored the behavior of an actual researcher was investigated by the prior art. When other researchers used the computer program, they were able to conduct expert level searches of chemical abstracts without assistance. See an article by P. J. Smith and Chingnell, M. *Development Of An Expert System To Aid In Searches Of The Chemical Abstracts* (1984) Challenges To Information Society: Proceeding Of The 47th ASIS Annual Meeting, (pages 99–102) White Plains, N.Y. Referring to FIG. 2 there is shown a block diagram of an artificial intelligence module employed in this invention. In the figure reference numeral 20 denotes a computer or CPU which functions in part as the inference engine of the artificial intelligence module. There are many processors and computers that can be used to implement the CPU 20 such as the NeXT computer. Other components of the artificial intelligence module include a memory which is divided into a database 21 and knowledge base 22. There is shown a programmable readable memory or PROM 23 which functions as the rule base for the artificial intelligence system.

There is also shown a random access memory or RAM 25 which stores information as message headers and is accessible by both the keyboard 26 and the input/output (I/O) unit 24. Also present are an input keyboard 26 as well as various external units such as an optical scanner 27, a fax terminal 28 and a dash line indicating direct coupling through a modem to a telephone or data line. The artificial intelligence system shown in FIG. 2 can directly access a newspaper database or employ other techniques for loading the knowledge base 22.

Both FIG. 1 and FIG. 2 depict conventional block schematics of intelligence or expert systems as is well known in the prior art. The remainder of the discussion will provide information concerning the particular problems and solutions solved by the system herein. As one can ascertain from FIG. 2, the CPU which acts as an inference engine provides the inference process whereby decisions are made based on simple rules from the rule base 23.

As one will understand the key is that the inference engine is only as powerful as the database of rules. Thus, the rules are extremely important in determining the efficiency and operation of the system. The expert system as indicated is a rule based computer program that can model the decision making process of an expert in a given field. As will be explained, the present system may employ natural language processing "NLP" which enables the computer to understand the meaning of regular language grammar. Understanding the context of words is a sophisticated area in artificial intelligence. It is unusually only possible to allow a computer program to have NLP within a specialized area. Thus, while natural language processing is extremely difficult it can be employed in the present system.

As indicated above, the artificial intelligence system of FIG. 2 must have the articles of concern or data, such as the text from a newspaper, entered into the system. These articles may be typed in or may be taken from a computerized news service such as Compuserve or DLALOG. The end result is that the article is stored in an ASCII file to be processed by the CPU 20. The data can be stored in the CPU 20 through the input/output interface or stored for example in memorys 21 or 22. The insertion of the articles from the newspapers is the responsibility of the user of the system and can not be implemented by the inference engine in CPU 20. The user selects the article to process from the list of files which may exist on a hard disk or derived from a suitable database.

The file which is in the ASCII format is processed and the results of the processing are displayed by means of the display 11 associated with the CPU 20. The results as will be explained include article type, age level the article is directed at, the focus of the article and main topics of the article. In any event, the criteria for categorizing the article is stored in the rule base 23, which memory can be implemented by RAM and so on. The database must be created again by the application user. Entries may be up-dated, deleted, added at any time. The user than selects topics and enters the keyword or phrase. The user then attaches a weight between 1 and 100 to the phrase or some other range of values. The application then adds this criteria to each topic selected in the database. Each file on the computer has to have a name associated with it. Suppose an article is an editorial, the user can then save the file with the extension edt. An example of a file name would be "Article 1023.edt". This way when the user is scrolling through a list of files the user will know that it is an editorial. It is also convenient for the application to use the file type in this fashion.

As will be explained, the application scans through the chosen article looking for phrases or keywords which are entered into and stored in the rule base 23. If the application finds a phrase or keyword, then it looks in the Data Dictionary to find out which topics are associated with the phrase and increments the Topic Counters. After this is done, the application multiplies each of the Topic Counter's by the user defined weight for each phrase. The topic with the highest weighted value is selected and this result is displayed on display 11 for the user. The use of a powerful index tool which is a typical program operated on the NeXT computer is called Digital Librarian or another is called P-word and both allow for quick access to the files. Examples of such programs are Digital Librarian and P-word, both are available from the NeXT Computer Company and are used interchangeably herein.

Figure 3:
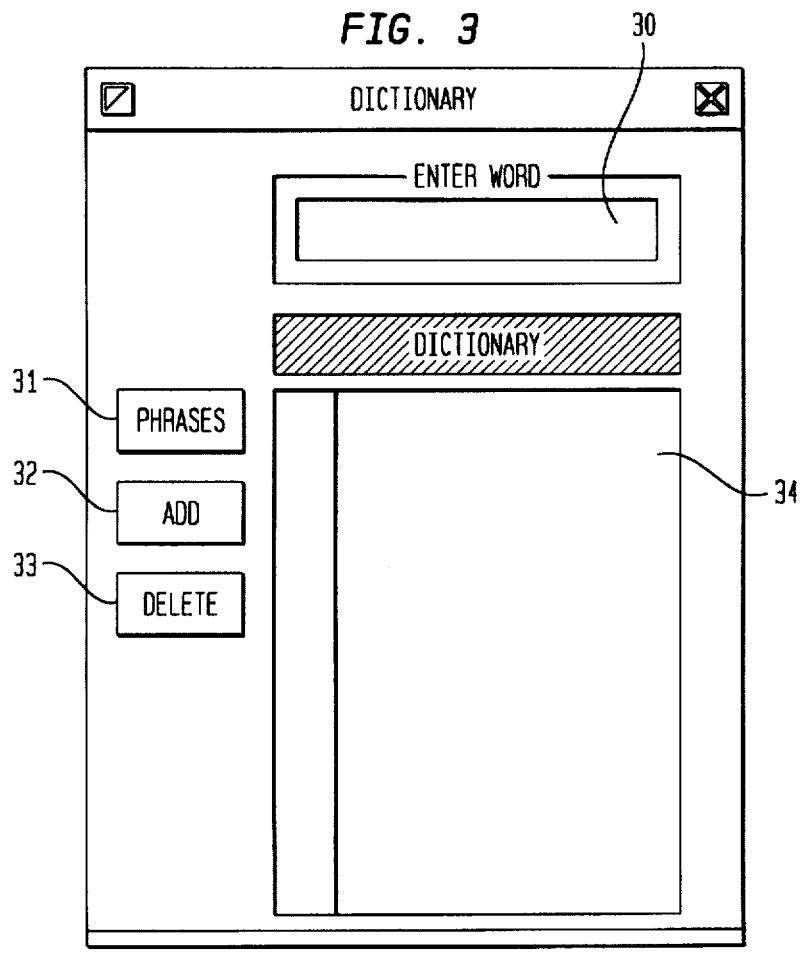
FIG. 3 is a diagram depicting an application screen showing a Dictionary operation which is used in conjunction with the expert system.

A histogram is created for each file by P-word, aunix utility on the NeXT computer which can be scanned by the inference engine to create a phrase list. Thus the P-word program output can be stored in the knowledge base or the internal memory of the CPU 20. As will be explained, this is referred to as a "pword list". Referring to FIG. 3 there is shown an application screen which appears on the display and which operates in conjunction with the present system. As one can see, FIG. 3 depicts a display panel entitled DICTIONARY. The Dictionary panel displays an alphabetical listing of all words that have been entered in phrases. This list is used to determine what words are present in a scanned file. When a file is scanned, the Dictionary checks which words are in the Dictionary memory and are present in the scanned file. If a word is present, a FOUND flag is set internally. This helps the PHRASE LIST to be describe to determine which phrases are valid for the scanned file by comparing each word in the given phrase against the words checked as FOUND in the Dictionary.

A word can be a single word such as handicap or a group of words like, blind person or blind and deaf. Note that handicap and handicapped are considered different words. This is important because when a file is scanned the application will be looking for specific variations of a word. In other words, a phrase is to be considered TRUE if any variation on the word handicap is found. Hence one may state the phrase as "handicap or handicapped or crippled". Thus as seen in FIG. 3, there is an Enter Word panel 30 whereby a user via the computer keyboard can directly add words to the Dictionary via the Enter Word box 30. Thus, the user can type in a word on the keyboard and the word will appear in the Enter Word box 30. As can be seen, there are three blocks or modules 31, 32 and 33 designated as Phrases, Add and Delete respectively.

By accessing the Phrases button 31 the display 34 displays a list of phrases in the stored phrase list which contain the currently selected word in the Dictionary. This module or button 31 can be accessed by means of a mouse, a light pen or a pressure sensitive overlay on the display screen and so on. The selection of the ADD button 32 adds the word in the word box to the Dictionary. Thus as indicated the user can then type a word or a phrase in via the keyboard and by accessing the ADD button 32 can now add the word to the dictionary. The Delete button or module 33 deletes the currently selected word from the Dictionary while the area 34 provides a list of all words which are included in the Dictionary. Thus, by accessing the Phrases button or area 31 one now brings up a list of all phrases which have been entered in the PHRASE BUILDER.

If a word is found to be included in one or more phrases, the user may not want to delete that word because if a phrase word is deleted all phrases including that word are invalid and these phrases will never be found in a scanned file. The ADD button or module 32 enables the following operation By typing the word in the Enter Word text field 30 and then by pressing the ADD button 32 that word will be added to the Dictionary if it is not already present in the Dictionary. The Delete button 33 deletes the highlighted word from the Dictionary 34. It does not delete the word from phrases. However, every time a text file is scanned the deleted word will be ignored if present in a text file thereby setting all phrases containing this word to NOT FOUND. The word can be added to the ictionary in one or two ways:

1. Enter a new phrase in the PHRASE BUILDER containing the deleted word and it will be added to the Dictionary again.
2. Type the word in the Dictionary panel text field 34 and press the ADD button 32.

Figure 4:
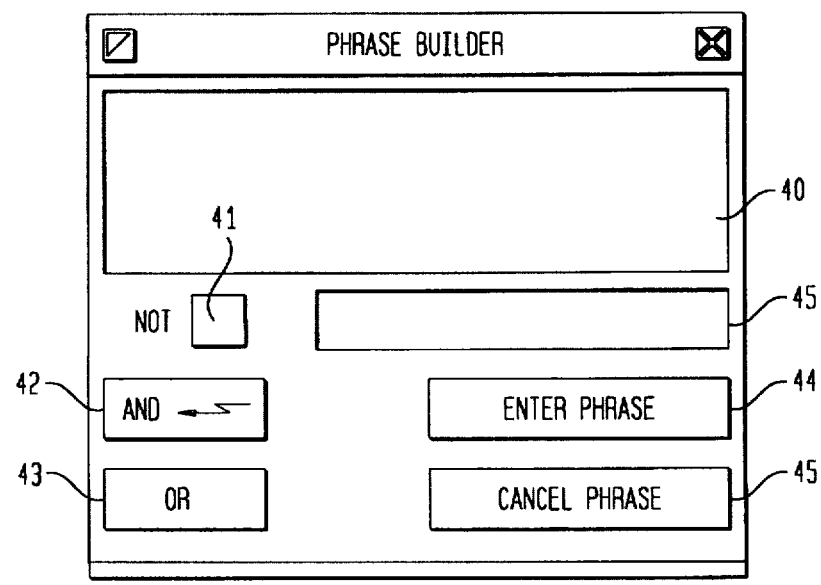
FIG. 4 is a diagram showing an application screen which is used in a phrase builder panel to enable the implementation of a rule base according to the present invention.

Referring to FIG. 4, there is shown the application screen associated with the above-noted PHRASE BUILDER function. The phrase builder panel is used to enter new phrases in the phrase list. A phrase is made up of words or groups of words separated by logical operators And, Or Not. Examples of valid phrases and their meanings can be found under the heading "Valid phrases" in the help window 45. As seen in FIG. 4, reference numeral 40 refers to a central display or window where the phrase being built by the user is displayed in the area 40. New phrase words are typed in the word box 45. There is shown a key or button 41 designated as NOT. When the NOT button 41 is selected, the entered word is negated. There is also shown buttons 42 and 43 designated as AND and OR. These are logic conjunctions whereby a user can add phrase words with the AND button. The area 44 entitled Enter Phrase and button 45 entitled Cancel Phrase enable a user to enter a new phrase by pressing the Enter button 44 or erasing a phrase by pressing the Cancel button 45. The operation is as follows.

To enter the phrase "Handicap" one clicks in the white text field 45 in the phrase builder. This can be accommodated by a mouse, a light pen and so on or by other extremely well known techniques to access screen displays. In any event, one then utilizes the keyboard to type in the word "Handicap" and presses the Return or Enter key on the keyboard. The word "Handicap" will appear in the area or window 45. If one wishes to enter this phrase in the phrase list, then one presses the Enter Phrase Button 44. The user can then verify that the phrase was entered by bringing up the Phrase List Screen in area 40 and looking in the Phrase Browser for the phrase. By entering the phrase "handicap" the user is stating that any tags associated with the word will be True if the word "Handicap" is in the scanned file. As a particular example, assume that a user wishes to add the phrase or word "Handicap" and "crime or blind and not crime". The following format is implemented 1. Type handicap, press (return)
2. Type "crime", click the AND button 42 or press [return]
3. Type "blind", click the OR button 4343:
4. Type "crime", click the NOT switch 41, click the AND button 42 or press [return]
5. Click the enter phrase button 44.

Thus, one now has entered the phrase blind and crime and so on. If a mistake is made, then the Cancel Phrase Button 45 is pressed and the above sequence is implemented again. Pressing the return key or enter key on the keyboard is equivalent to actuating or pressing the And button 42 after the first word has been entered. These operations as explained are straight forward and can be programmed in various ways by one skilled in the art.

Figure 5:
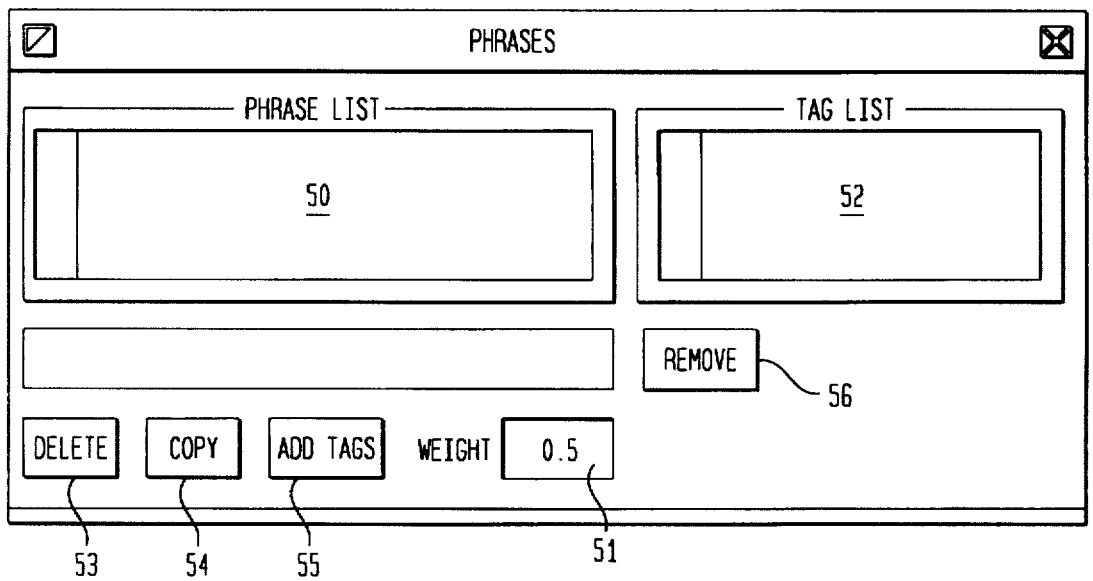
FIG. 5 is a diagram depicting a phrase list panel display used in conjunction with the present invention.

Referring to FIG. 5 there is shown the application screen for the Phrase List panel entitled PHRASES. The Phrase list panel via the window 50 displays a list of all the phrases entered in the phrase builder shown in FIG. 4. The panel is also used to associate tags from the General Information window 52 with phrases in the phrase list window 50. The logic used is known as inference. That is, when a file is scanned and a program determines that a phrase is in the file, it infers that all tags associated with that phrase are also related to the files. Tags are manually associated with a phrase by a process which will be described. In order to add a tag to a phrase, one accesses the phrase list panel 50 as shown in FIG. 5. All phrases are listed in the phrase window 50.

If the list is empty, then one can add one or more phrases using the Phrase Builder module shown in FIG. 4. Referring briefly to FIG. 7 there is shown a General Information window appears on the computer display. In any event, when tags are added to a phrase one can now access or open the General Information window in FIG. 7 by selecting it in the window menu. The user can check one or more tags which are related to the selected phrase. The system enables the user to enter the weight of the tag between 0.00 and 1.00 in the weight box 51 in the phrase list window 50. As one can see, the weight box 51 contains the weight numeral 0.5. The user presses the Add Tags button 55 in the Phrase List Window 50 to add all the selected tags at the weight entered in the Weight box 51. The Add Tags button 25 enters all tags as relationships to the selected phrase in the tag list. The Tag list is displayed in window 52. The scrolling is implemented by a graphical slider or can be moved using the mouse or by the computer keyboard and the user can view the entire Tag List in window 52 which is to the right of the Phrase List window 50. The tags are entered with the weight displayed in the weight box 51.

If the user wishes to add tags of different weighted values, then the process must be repeated for each weight. Suppose a user wanted to add three tags with the weight of 0.35 and four tags of 0.75. The process described above is then followed, checking the three tags at 0.35. The user will then type 0.35 in the weight box and press the Add Tags button 55. By activating the Unselect all button 74 in the General Information window of FIG. 7, one now clears the selection. The process is repeated, as described above by, checking the four tags the user wants with a weight of 0.75. The user now types 0.75 in the weight box 51 and presses the ADD TAGS button 55. If a tag was already displayed in the tag list for a given phrase its weight will change to a new weight in the weight box if it is selected again.

In any event, as seen in FIG. 5 the Remove button 56 operates to remove tags from the tags list 52. The Copy button 54 can be employed to copy phrases while the Delete button 53 can be used to delete phrases. In any event, referring to FIG. 7 there is shown the General Information window which is used with the display 50. The General Information window represents all the different categories the scanned article may fall into. The categories are broken into four groups designated by reference numerals 70, 71, 72 and 73. Each processed article can have more than one item selected in each group. The Article type 70 can be an Editorial/Opinion, Straight News, Featured stories/ individuals or Featured stories/organizations. As one can see, each listing in the Type box 70 has a selection area or box to the left whereby the user can select a topic by specific by assess to the box with a mouse or light pen and so on.

Module 71 depicts the Age Level associated with the particular group and for example specifies Infants, Students, Adults, Senior citizens and so on. These categories can also be selected. Module 72 depicts Focus of the Article which is the general nature of the article, for example, as Emotionally Disturbed, Mentally Retarded, Visually Impaired, Handicapped and so on. Module 73 depicts the Topic of the Article as for example Aids and the Handicapped, Recreation, Sports for the Handicapped and so on. Each of the topics or Areas in each of the modules as 70, 71, 72 and 73 can be selected and each category is referred to as tag. This is because a category can be tagged referring to one or more phrases in the phrase list. Thus, an article can be tagged as Straight News by module 70, as concerning College Students in module 71, who are Mentally Retarded in module 72 and who have been engaged in Vocational Recreation in module 73.

As one can ascertain by referring to FIG. 7, there is shown a number of buttons as for example button 74 designated as Unselect All. The Unselect All button 74 checks all tags OFF. The selection of this button is used for clearing the screen or display after entering tags in the phrase list which was described in conjunction with FIG. 4. The Select All button 76 checks all tags ON. The File Statistics buttons 75, 77 and 78 are respectfully designated as Show All, Show Union, Show Interaction and are used to display a list of previously scanned files based on user defined criteria. If the user clicks on the name of the file, that file is displayed in the window for viewing. The Show All button 75 brings up a list of all files that have been previously scanned. The Show Union button 77 involves the use of tags.

By selecting the Show Union button 77, a list of every file associated with one or more of the tags currently selected (checked ON) in the General Information window is displayed. For example, if Type: Editorial and Focus: Deaf/Blind are checked ON the english equivalent would be: "Show me a list of all the previously scanned files which are either editorials or focus on deaf/blind or both". A user can click as many tags as desired to create a selection criterion. The Show Intersection button 78 is similar to the Show Union button 77 except accessing the button brings up a list of files which are considered to have all the tags selected in the General Information window.

For instance, if a user clicked a tag selected in the last example and then selected the Show Intersection button 78, the English equivalent would be: "Show me a list only of all the previously scanned files which are editorials that focus on deaf/blind". The files may be considered or related to tags not selected in the General Information window. However, the files must at least be associated to all the tags selected in the window if the Show Intersection button 78 is pressed.

Figure 6:
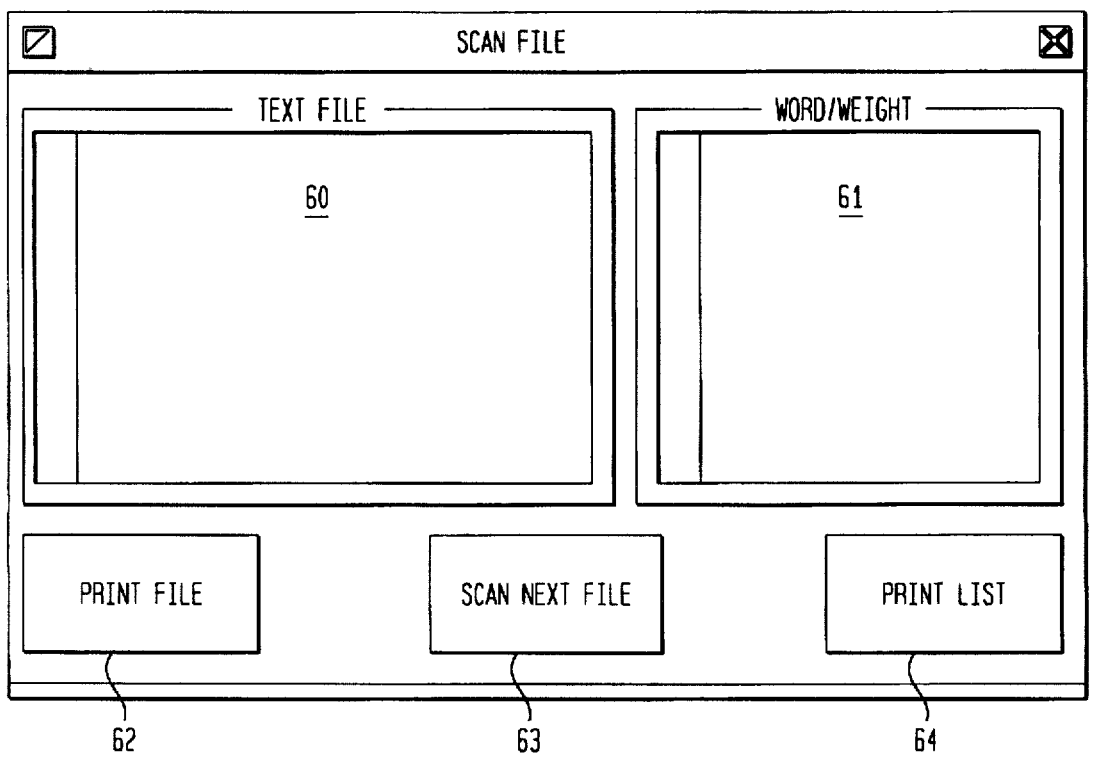
FIG. 6 is a diagram depicting a display of scanned file window which is used in implementing the present invention.

Referring to FIG. 6, there is shown the screen presentation of the Scanned File window. The Text File area 60 displays the most recently scanned text file. The Word Weight window 51 shows the "pword" file generated by running the indexing tool "pword" on the current text file. There is shown a Print List button 64. By selecting the Print List button 64 the system will print the "pword" weighted word list for the current file. The Scan Next File button 63 when accessed scans the next file in the user selected directory. The Print File button 62 when selected prints the currently scanned text file. The printing can of course be on a conventional printer associated with the computer. In any event, when a file is scanned the text is displayed in the Text File box 60. The file is then run through the computer's indexing tool "pword". "Pword" associates a frequency value with each unique word found in the file, this list is displayed in the Words/Weight box 61. The selecting of the Print File button 62 will enable one to print the text file. The selection of the Print List button 64 will print out the "pword" list for the file.

When scanning multiple files, an alert appears asking the user if he wishes to scan all files at once or individually or cancel the request. If the user selects the individual file, the Scanned File window 60 will show the file after each file is scanned. Selecting the Scan Next File button 63 will make the program scan the next file in the list of files to scan. In any event, by employing the system one can look at a file by clicking on one of the file names on the list. The selected file is then loaded. To erase the file from the list it would be selected in the file list and one would access the Remove button at the bottom of the window.

Figure 8:
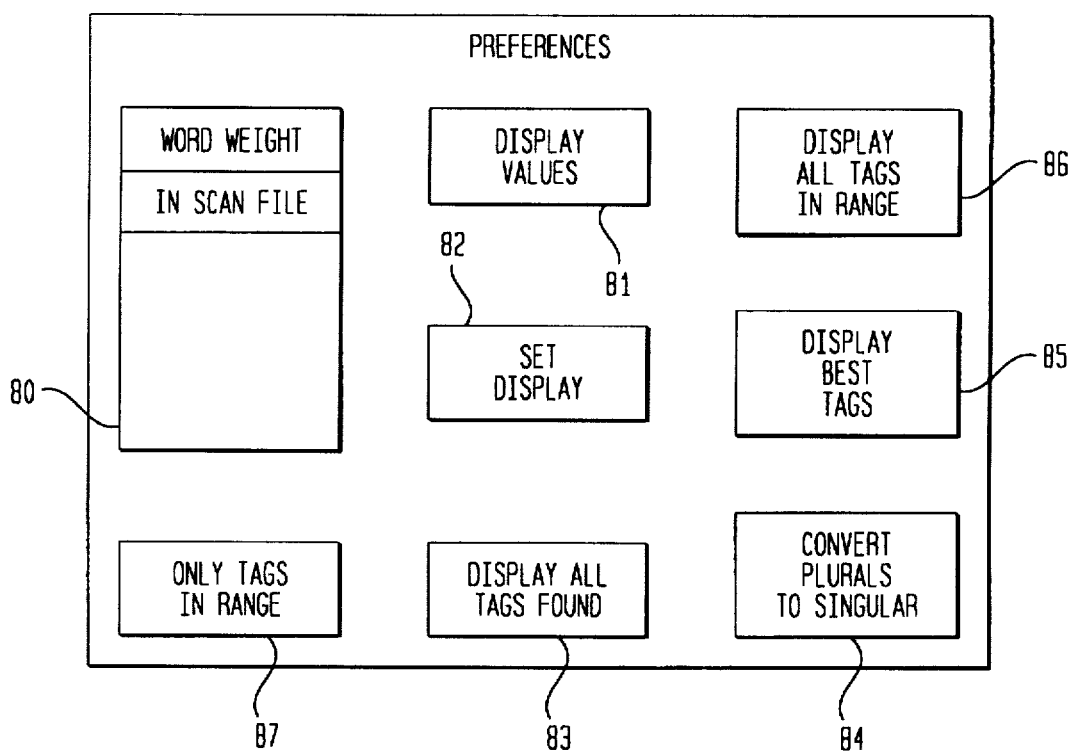
FIG. 8 is a diagram depicting a preference screen for use in implementing the present invention.

Referring to FIG. 8, there is shown the inference engine screen for the preference mode of operation. By selecting options listed in the Preference Display Panel a user can change the behavior of the scanning algorithm used by the inference engine. The preferences are broken up into four areas. Reference numeral 80 designates A Word Weight In File Scan. When a file is scanned through the computer indexing tool, "pword", it generates a list of unique words in the file with an associated weighted frequency. This frequency value is used to determine if a word is important in the scanning of a file. There are three methods of scanning. The absolute frequency method simply counts how many times a word appears in a file. If the word "handicap" appeared three times in the file, "pword" program would return "handicap 3.000". This would be displayed in module 70. It is noted that handicap, handicapped and handicaps are all considered different words. The relatively frequency scan method takes a number of instances of a word and divides it by the total number of words in a file.

If there were a thousand words in a file and five of them were the word handicap, "pword" would return display "handicap 0.005". This would be displayed in display 80. The index of peculiarity method takes a number of instances of a given word in a file and divides it by a weighted index of all words in the computer Dictionary. The weighted table can be altered. The Display Value Module 81 operates in two modes to display only words with frequency or to display ONLY TAGS WITHIN RANGE. Using the frequency method selected in the Word Weight In File Scan module 80, the display value 81, sets the smallest weighted word that will be considered in the scan. In other words, a word having a smaller weight then the value entered in the entry box will not be considered in the scanning process. This program ignores the fact that the word is present in the file and all phrases containing that word will be considered false. The only Tags With In Range method operates as follows. After tallying up all the tags associated with phrases in the scanned file, the program will display the tags with the highest total weight based on the method selected in the Set Display box 82 in the Preference Panel.

Only those tags with a weight greater then the number entered in the Only Tags Within Range module 87 be considered. This helps narrow the selection range if there are a lot of possibilities. Also shown in FIG. 8, is a Set Display On Window 82. The Set Display window operates with buttons 83, 85 and 86. The Display Best Tags button 85 allows only the highest weighted tag to be displayed in each category. The four categories are Article Type, Age Level, Focus and Topic. These are shown in the General Information display of FIG. 7. The Display button 83 indicates Display All Tags FOUND. Every tag which is associated with a phrase found in a scanned article will be checked regardless of the weight. Display All Tags in Range button 86 will enable only tags with a weight greater than the value in the Only Tags Within Range box in the Preference Panel to be displayed. The switch designated 74 converts plurals to singulars. Selecting this switch 74 enables one to convert the form "handicap" to "handicaps" to make each word equivalent to the other.

In the appendix, the HEADER FILES for each of the above described code modules.

Thus the Header Files For Opening And Closing Files, Scanning Files, Phrase List Generation, Dictionary and so on are shown in the Appendix attached hereto.

With the above in mind, reference is again made to FIG. 2 to show and explain system operation. An article obtained on-line by professional searchers are captured in the computer file and stored in the knowledge base 22 or the database 21. Essentially, the articles can be entered by means of a modem coupled to the input/output control 24 and then controlled by the CPU 20 to load the knowledge base 22 accordingly. The CPU 20 includes a program that is basically described above and creates an interactive questioning between the information contained in each article stored in the knowledge base 22 and a set of logic rules which essentially determine an appropriate category stored in the rule base 23.

The categories, including Type, Age Level, Focus of article and Topic of Article are shown in the General Information format of FIG. 7. In the design of expert systems, this approach is called the stimulus-situation and appropriate-response condition. Thus, all articles of interest are directed to the knowledge base 22, which is coupled to the database 21 and as indicated can be derived from many sources. The Programmable Read Only Memory 23 or Prom contains the rule base and essentially operates in conjunction with the CPU 20 which performs the part of the inference engine.

The inference engine is used as a building block and is a process where decisions are made based on simple rules. The rule base 23 operates in conjunction with the General Information display in FIG. 7. Once the Tags are selected based on the General Information display the inference engine 20, in conjunction with the rule base 23 begins to select those articles which possess the keywords and phrases. This is done by searching or scanning algorithms and is relatively well known. In any event, the system operates by responding to the following instructions from the rule base. For example, does the article discuss children or persons who are handicapped and who have AIDS. The inference engine can make a more precise evaluation by taking into account the context of the words "Handicap", "Aids" and for example by searching for the occurrence of other words such as "names" or numbers and therefore make a decision as to whether or not the article is acceptable.

Thus, in regard to operation of the system, the system may immediately know by means of the tags on how to select all articles in the knowledge and database which contain the words and tags as selected by means of the General Information Screan of FIG. 7. One can also use the Phrase Builder of FIG. 4 to create the rules for the rule base 23 in regard to appropriate phrases. As one can ascertain, the process will enable the rapid scanning of newspapers regarding the information characteristics described above. The rule base 23 essentially is developed by the user who can operate with the Phrase Builder module (FIG. 4) to select phrases in conjunction with the General Information format which operates to supply tags to these phrases.

In this manner, the system can pick out articles which are theoretically beyond the capability of the researchers who would need to spend excessive amounts of time, in reading every article in detail to categorize the same. For example, the system can select all articles from tens of thousands of newspaper articles concerning disabled people between the ages of 15 and 20 who reside in the northern part of the East Coast and who are on welfare. The General Information displayed in regard to FIG. 7, enables the categories to be selected on a gross basis while phrases enable the building up of a very comprehensive rule base. As one can understand, the generalized concepts can enable interested parties to correlate electronically obtained media/text information and to do surveys and searches in regard to public attitude. The above is of particular utility to the insurance industry whereby vital statistics can be determined which exist in newspaper and media articles and which can be rapidly scrutinized by the expert system described herein.

With the above comments in mind reference is made to FIG. 9 where there is shown a block diagram format which essentially describes system operation. Reference numeral 90 refers to a knowledge base which is associated with the expert system. The knowledge base contains all articles which may be stored from lists of files on a hard disk or may in fact be transmitted to the knowledge base by an outside database 96. The database 96 may be for example, the DIALOG database as shown by reference numeral 91. Data can be transmitted by a telephone or communications link 95 through a modem 94. Such techniques are well known and essentially the transmittal of information from the database can be implemented under control of the CPU 100 which also operates to provide the inference engine characteristics associated with the expert or artificial intelligence system.

As indicated above the knowledge base 90 may contain articles which are to be processed from a list of files. Each file is in the ASCII format and is processed and eventually the results will be displayed on the computer display 110. In any event, the ASCII is the American standard code for information interchange. This is a seven bit code also known as the USA standard code for information and interchange (USASCII). Because eight bit bytes are common on computers, ASCII is commonly embedded in an eight bit field in which the high order (left most) bit is either used for a parity bit or set to zero. Essentially, all characters represented in the English language are represented in ASCII.

As one can understand the knowledge base 90 contains a plurality of articles from various newspapers accumulated and stored over a great deal of time and essentially all such articles can be stored therein on CDs, hard disks, tapes and so on. As indicated above, the article or file which is in the ASCII format will be processed and the results displayed by the display 110. The results include Article Type, Age Level the article is directed at, The Focus of the article, and the Main Topics of the article. This breakdown was shown in FIG. 7 and is indicated herein as module 112. It is, of course, understood that the entire format depicted as General Information in FIG. 7 is and can be displayed on display 110. In any event, the computer or CPU 100 which is the inference engine has all those topics specified in FIG. 7 stored therein. The next thing that the user wishes to do is to enter the criteria for choosing the article. This essentially is the part of the rule base. This rule database must be created by the user. The user selects Topics by means of the General Information display, which topics cause predetermined keywords or phrases to be displayed to the user. In any event, since the user has greater knowledge the user then selects keywords or phrases as desired and enters these via the keyboard 115. The Phrase Select Module 116 causes phrases selected or keywords selected by the user to be inserted into and stored in memory in the CPU 100. The user then as indicated utilizes the keyboard 115 to assign a weight to selected words or phrases which weight can be between 1 and 100 for each Keyword or each phrase using the PHRASES Screen of FIG. 5.

The user can select a number of keywords for each particular article such as ten, twenty and so on. The application then via the CPU 100 assigns the selected weighted value to each keyword to develop a criteria which is added to each Topic in the database. A phrase is in the form as follows {[not] <word> [[and, or] [[not] <word> . . . ]}. An example of a valid phrase is "deaf or education and not blind". In this manner the phrase "deaf or education" is searched so the article would be searched for the words deaf or education and will be searched for deaf and not blind or education and not blind and so on. As indicated above, the database is in ASCII form as depicted by module 92.

In any event, the knowledge base 90 can also receive articles directly via an optical scanner 93 and so on. In order to enter the article type criteria the system can use a natural language parser or NLP. The present system employs predefined names for the articles. For example, the database 96 will classify articles already typed as Editorials, Straight news, Feature stories and so on. Therefore, the type designation depicted in FIG. 7 is already predetermined and therefore the system user can request the CPU to search the knowledge base 90 for editorials only in regard to the particular selected keywords.

The system can also operate to Type or classify the scanned article if this information is not available. For example, each file in the computer or in the knowledge base 90 has to have a name associated with it. Assume an article is an editorial as indicated above. The user can then save the file with the extension edt, an example would be Article 1023.edt. This way when the user is scrolling through a list of files he will know whether a file is an editorial and therefore he will know the Type. In the same manner, the article can be designated as straight news by .snw and so on. It would be also convenient for the application to operate in this manner.

As indicated above, the system, once the article is selected, scans through the chosen article looking for phrases which have been entered into the CPU 100. The system via the Scan Selected algorithm module 130 commences to scan the article according to a typical search algorithm. In other words, the system can utilize an appropriate algorithm to expedite the scanning of the keywords or phrases associated with each article. Such algorithms are well known and for example the system may first look at the last two bits or the first two bits of each scanned word as compared to the bits of the keywords. The system will then scan the article for each of the keywords or phrases entered into the keyboard by the user as indicated by module 116 and each phrase or keyword will have assigned weights.

The scanning indicates that a word has been found by means of a comparator 131. The comparator 131 indicates that a comparison of a keyword has been made. The comparator 132 indicates that a comparison of a phrase has been made. Once a phrase or keyword is detected then the system searches in the Data Dictionary 135 to determine which topics are associated with the phrase and increments the Topics Counter. For example the scanning process commences in module 130 which scans the article selected by means of the algorithm. Each time a keyword is indicated in comparator 131 it is specified that the scan has found one of the keywords. The module 131 then activates the Data Dictionary memory 135 to see if that keyword appears in the Data Dictionary. The keyword is associated within the Data Dictionary with a Topic of an article, a Type of an article, an Age and a Focus. In this manner, by incrementing the Topics Counter, one can determine whether each keyword or each phrase is associated with an age level, focus of an article, a topic of an article, or type.

Thus, these counters can select the Topic as indicated by a module 150, can select a Type by module 151, can select an Age module 152, can select the Focus of an article by module 153. This is done for each keyword and it's done for each phrase. In any event, what happens is the Counters 200 which include Topic of articles, Type Focus constantly are incremented and the results stored. The application or system multiplies each value of the Topic Counters by the user weight defined by the programmer for each phrase or keyword. In any event, the topic with the highest weighted value wins and this result is displayed for the user as indicated by module 155. The display essentially is the General Information display and is displayed on the display 110.

As indicated previously, the user also has the capability of going directly to the display 112 as shown in FIG. 7 and pick categories which he desires to search. The system will then give the user appropriate keyword and phrases to be used in conjunction with these categories. In any event, the user may determine better keywords for better searches. As indicated above, there is a program designated as the Digital Librarian which is an indexing tool utilized on the NeXT computer which allows for quick access to the files. In this system, a histogram is created for each file, by the program which again is scanned by the CPU 100 via the inference engine portion 130 to create a phrase list which can be displayed on display 110 and can also be presented to the user.

Thus, as previously explained, the Data Dictionary of memory 135 a file of objects is also associated with the Data Dictionary panel shown in FIG. 3. This module 135 list and stores all words that have been entered in phrases and this list is used to determine what words are presented in a file. In any event, the screens entitled PHRASE BUILDER of FIG. 4 and PHRASE LIST of FIG. 5 depicted in module 160 are again associated with the Enter Keyboard or Phrases module 116. As indicated, the Phrase Builder aspect enables one to enter new phrases in the phrase list. This has been explained above. The phrase list displays a list of all phrases entered into the phrase builder, this list is also used to associate tags from the General Information window with phrases in the phrase list.

When a document is scanned, the phrases are compared in COMPARE modules 131 and 132 with the phrases in the phrase list. There are stored in the Data Dictionary memory 135. Each stored word is associated with tags and the system infers that when a file is scanned and it is determined that a phrase is in the file than all the tags associated with that phrase are also related to the file. One can add tags to a file or phrase and can change the weight. In this manner, one can again determine the criteria set forth in module 200. As also seen in FIG. 9, once a keyword has been compared and a phrase has been compared one counts the number of keywords found in the article. In counter module 150, and counts the number of phrases found in counter module 152. Each phrase and keyword is associated with a weight and therefore one can determine the highest weighted keywords and the highest weight phrases and therefore select the Topic of the article, the Type of article, the Age of the individual, and the Focus as indicated above. There is shown coupled to the Count KeyWord module 150 and the Count Phrase Module 151 an ALU 165 and ALU 166. As seen, other inputs of the ALU come from a Word Counter 170. The Word Counter 170 counts all words in the article.

Using the Word Counter 170 and the ALU 165 and 166 one can determine the word weight as explained above in the Scanned File description. One can therefore determine the absolute frequency of how many times the word appears in the file, the relative frequency of a word divided by the total number of words in the file and so on. This operates in conjunction with the scanned file module 180 which is associated with the scanned file panel shown in FIG. 6. Thus, as one can ascertain the system operates essentially by searching articles dependent upon keywords which pertain to handicap persons in this particular example. By entering keywords and phrases one can then scan the articles and each time a keyword is found the system accesses the Data Dictionary or memory and looks for the keyword or phrase and the associated tags.

The keyword or phrase in memory is associated with a plurality of other memory locations which store the tags. The tags essentially indicate that the keyword is associated with the following topics. For example, let us assume for a very primary example that the keyword is "blind". Thus, the system begins to search an article and finds the word "blind". Further assume that the word "blind" has the highest weight so it is the most desirable word to be found. Further assume that the word "blind" appears more than once in the article. This is very important for if the word "blind" appears at a certain frequency value which can be determined by the user of the system or can be predicted by the inference engine then the word is TRUE. The word "blind" by appearing a given number of times which is determined by the inference engine and for example can be learned by the system is deemed to be a valid word depicting the handicap "blind".

Once a predetermined weighted value is associated with the keyword "blind" the Data Dictionary or memory 135 may have stored with the word "blind" tags which have been selected from the list of FIG. 7. Thus, if one looks at module 72 which is the Focus of the Article the word "blind" would be associated with the Deaf/Blind box. Therefore, the system will immediately give this Focus box a high priority. The term Visually Impaired also appears in module 72 and this will receive an even higher priority. Thus, based on the selection the system will pick Visually Impaired over deaf/blind. Thus, the system based on the keyword "blind" will select the Focus of the Article as the category Visually Impaired. This will appear in the Focus Select module 153 and be displayed on display 155. Now also assume that another keyword "employment" is selected with "blind".

Thus, the word "employment" would be scanned for in the article and again this keyword would be found as designated by module 131. The occurrence of the word is monitored in a separate counter where it would be counted. The finding of the keyword "employment" would then cause access to the Dictionary 135. The access would lead to further storage locations where the Focus of Article again may specify in module 73 the category Employment of Handicapped. Thus, by using the two keywords "blind" and "employment" the system can select the Topic of the Article as Employment and the Focus of the Article as "Employment of the Blind". As one can ascertain, the system may also utilize the keyword "student" and "college" and such words enable the system to select an age level. The system of course cannot actually determine an age level if none is given in the article but may look for various keywords, strictly dependent upon the ability of the system user to understand the problem being searched and to have a knowledge of the rule base, to provide the set of rules to enable the inference engine to make the correct decisions based on the inferences.

As one can ascertain, the system described above is unique in the sense that it will enable extensive and rapid literature searches to enable one to categorize articles and to rapidly search media articles such as newspaper articles and for reviewing the information content in the articles and for categorizing the subject matter according to predetermined and desired topics.

This system has tremendous use in the insurance business where newspaper articles, obituaries and other data can be scanned to determine age of people, cause of death, accidents, deaths due to accidents, disabilities and so on. To do this by any other means would be virtually impossible including normal computer search techniques as presently employed.

Thus, the use of this system results in a unique apparatus for studying newspaper coverage for persons having extreme disabilities. It is of course understood that the techniques can be applied to the searching of different topics. In regard to scanning techniques and other knowledge base techniques, which are widely employed, reference is also made to a text entitled "Introduction to Knowledge Based Systems" by Richard Frost published by McGraw Hill Publishing Company (1986). There are many examples of many other articles which are pertinent to expert systems in general.

The Following Section Contains The Header Files For Each Code Module.

APPENDIX

```
/* Generated by Interface Builder */ import <objc/Object.h>
/*
Controller is the main class of the Inference Engine application. It controls communication between all the controllers in the application.
Controllers are objects which handle interaction between the user and the data objects. For instance the Dictionary controller handles taking user
input and entering it in the dictionary object.

The generic Controller object handles opening and closing files, scanning new text files and handling phrase lists etc...
*/
@interface Controller:Object
{
    char currentFile[512];    /*The name of the currently open dictionary*/
    int dirty;                /* This flag is set to YES when a change has been
                                 made in the phrases, taglist, the dictionary or file list*/
    id  newPhrase;            /*Place holder for current phrase being built*/
    id  selectedPhrase;       /*Currently selected phrase in phrasebrowser */ id  alertStrings;         /*String object with alerts*/

//Dictionary Controller and related objects
    id  dictionaryController; /*DictionaryController object*/

//Phrase controller and PhraseList Window objects
    id  phraseController;     /*PhraseController object*/
    id  phraseBox;
    id  phraseButtons;        /*Textfield displaying selectedPhrase*/
    id  phraseBrowser;        /*Buttons for modifing phraseList*/
    id  phraseList;           /*Browser for phraselist. Controller is the delegate*/
    id  weightForm;           /*List of phrases in current dictionary file*/
                              /*Weight value to be used in future addtags.
                                I used a form instead of textfield in case we
                                add other weighting criteria*/
    id  tagBrowser;           /*List of tags associated w/ selectedPhrase*/

//GeneralInfo Window Matrices
    id  ageSwitches;          /*Age matrix in General Info Window*/
    id  focusSwitches;        /*focus matrix in General Info Window*/
    id  topicSwitches;        /*topic matrix in General Info Window*/
    id  typeSwitches;         /*type matrix in General Info Window*/
    id  scanNextButton;

// Scanned File View and associated text objects
    id  textView;             /*Text object for scanned file*/
    id  textPanel;            /*Panel displaying textView and pwordView*/
    id  pwordView;            /*Text object holding the list of pwords*/

//Preference Panel and Associated Controls
    id  prefPanel;            /* Preference Panel*/
    id  pwordDrafts;          /* Preference Panel*/
    id  pwordWeightForm;      /* Choice of pword criteria */
    id  displaySwitches;      /* Default weightin scheme */
    id  conversionSwitches;   /* Choice of tag display modes */
                              /* A check = convert plural to singular */
```

```
//Status Panel and associated fields
    id      messagePanel;
    id      messageText;          /* Two generic text fields for displaying info */
    id      messageText2;

//Scan File Vars
    char    *fln;                    /* Current filename being scanned */
    char    *scanDirectory;          /* directory being scanned */
    const char *const *filenames;    /* list of all files being scanned */
    int     fcount;                  /* Number of files being scanned */
    int     showAll;                 /* 0=Show all files, 1 = Show files with some
                                        of the user criteria selected, 2 = Show files
                                        that match ALL user criteria selected in General Info window.
                                        The user presses a button in the window and this variable is set
                                    */ id      fileList;                /* list of files that have been scanned */
    id      fileSubList;             /* A sublist that contains files that have been scanned that meet user criteria*/
    id      fileBrowser;             /* Displays list of previously scanned files in the file sublist */
    id      filePanel;               /* the panel displaying the filebrowser */

//Action Methods in Phrase Builder
/* The phrase builder is a data entry window which is used to create new phrases */
-   addFirstPhraseWord:sender;       /* The first time a user enters a word in a phrase
                                        this method is called because no conjunction
                                        precedes the word
                                    */

-   addPhraseWord:sender;            /* After the first word is entered, this method is
                                        called for each word called to handle adding a
                                        word to the phrase being built. It builds a
                                        phrase word with the necessary conjunctions, etc..
                                    */

-   cancelPhrase:sender;             /* Erases phrase currently being built */

-   enterPhrase:sender;              /* This procedure adds a new phrase to the phrase list.
                                        If any new words are found in the phrase, they are
                                        added to the dictionary
                                    */

//Action Methods in Phrase List Window
/* This window displays a list of all phrases that have been built by the user associated with the current dictionary. When a user clicks on one of
   these, a list of all associated tags are displayed in the tag browser.*/
-   addTag:sender;                   /* Adds all tags selected in the General Info
                                        Window with the currently set weight in the
                                        weight form to the currently selected phrase
                                        in the phrase list window. If one of these
                                        tags already existed in the phrase's tagline,
                                        it is overwritten with the current weight set
                                        in the weight form.
                                    */
```

-29-

```
- deletePhrase:sender;      /* Deletes the phrase currently selected in the phrase list */
- removeTagFromList:sender; /* Removes currently selected tag(s) from currently
                               selected phrase's taglist
                             */

- displayPhraseBox:sender;//IM WORKING ON THIS ONE

//Action Methods in General Info Window
/* This window displays all the criteria for scanning files. These are called tags. The tags are used in two ways: 1) By selecting tags, a user can
   add them to a selected phrase in the phrase list window. 2) By selecting a group of tags, the user can query the database to show a list of files
   that contain the given criteria.
*/
- fileReportSet:sender;     /* Creates sublist by creating a list
                               of pointers to files in filelist
                               that match a given user criteria
                             */

- toggleAllTags:sender;     /*Turns all tags 'on' or 'off' */

//Actions in File List Window
/* Displays a list of files that have been scanned and match the users current selection criteria */

- fileSetboxTags:sender;    /* When a user clicks on a file in the file sublist,
                               the tags that are associated with that file are
                               turned 'on' in the General Info Window
                             */

- removeFileFromList:sender; /* Deletes a file from the filelist */

// MISC Actions
- scanNextFile:sender;       /* Scans next file in filename */
- showDictPhrases:sender;    /* Shows phrases that contain a
                                selected word in the dictionary
                              */

//Menu Item Action Methods
- new:sender;  //Creates a new dictionary
- open:sender; //Opens a dictionary file
- save:sender; //Saves current dictionary
- scanAFile:sender; //Scans a file //Default Handling
- writeDefaults:sender;//
- readDefaults:sender;//

//Misc
/*A support method for add Tags*/
- addTagsToThePhrase from:theMatrix :(int)theType;
- scanAFile:(char *)fn :(int)showAll; /*Used by scanNextFile to scan each file*/
-(char *)conversionPrefs;  /* Returns a string containing the selected
                              conversion options
                            */
```

```
-(char *)pwordPrefs;                    /* Returns a string containing the selected
                                           pword options
                                        */

- tallyPhrases;                         /* For a given pword list, this method determines
                                           which phrases are in the text file and which
                                           tags are most proper
                                        */

//M/A- displayIn;
- dictionary;                                      /* Returns dictionary object */
- addFileToList:(char *)f;                         /* Adds a file to the file list */
- setAllTags:(int)i;                               /* Resets tags to a given value */
- removeCellsFromTheBrowser inList:tbeList free:(int)f;// Removes objects from a browser list */

-(char *)scanDirectory;                 /* Scans a whole directory of text files */

- Notify:(char *)theStr;//Simple alert method
- openFile:(const char *)directory:(const char *)name;//Opens a dictionary file @end

-31-
```

```
/* Generated by Interface Builder */ import <objc/Object.h>

@interface DictController:Object
{
    id      fld;  // Text field displaying dictionary word
    id      dict; // Dictionary object
    id      dictPanel;
    id      dictBrowser;
    id      dictPhrasePanel;    /*Contains list of phrases associated with word in dict*/
    id      dictPhraseBrowser;
    id      dictPhraseList;     /*Contains a list of phrases containing selected dictionary
                                  word in the dictBrowser */
}

- init;
- new:sender;                       //Creates new dictionary object
- addWord:sender;                   // Adds a word to the dictionary
- subtractWord:sender;              // Deletes a word from the dictionary
- selectWord:sender;                // Displays selected word in fld
- dictionary;                       // returns the dictionary object associated with the controller
- setDictionary:sender;             // sets the dictionary object = sender
- displayDictionary;                // updates dictionary display
- showDictPhrases:PhraseList;       // Displays dictPhrase Panel @end
```

```objc
/* A dictionary cell is an object which contains a string ( a dictionary word) */ import <objc/Object.h>
@interface DictionaryCell:Object
{
    int count;           //TBA
    char stringValue[30];    //Dictionary word
    int foundWord;       //If word is found in pword list, this is set true
    int group;           //Indicates if word is actually a group of words separated by spaces
}

- init;
- incrementCount;
- zeroCount;
- decrementCount;
- setStringValue:(const char *)str;
- setGroup:(int)g;
- (int)group;
- (int)found;
- setFound:(int)f;
- (char *)stringValue;
- (int)total;
- write:(NXTypedStream *)s;
- read:(NXTypedStream *)s;
- awake;
@end
```

-33-

```
/* This object keeps track of dictionary cells.  It performs functions on this list of cells */ import <objc/Object.h>

@interface Dictionary:Object
{
    id  wordList;       //List of words
    int state;          //Flag to refelect state (clean/not clean)
}

- init;
- free;

- deleteWord:(const char *)word;
- addWord:(const char *)word;
- (int)wordInList:(const char *)word;        // Returns true if word is found in wordlist
- (int)wordInFile:(char *)word;              //Returns true if word is found in pword list
- (int)wordCount;                            // number of words in dictionary
- wordCellAt:(int)i;

- write:(NXTypedStream *)s;
- read:(NXTypedStream *)s;

- eraseDictionary;
- resetFind;                                 // Resets found variable for all cells
/* sets the find field for each cell based on the pword file fn.  textfield is just a message
field for displaying current status of process in. */- setFindForFile:(char *)fn
displayIn:textField;

@end
```

```
/*
For each file scanned, a file object is created. It keeps track of the files pathname and a
list of tags associated with this file
*/ import <objc/Object.h>

@interface FileObject:Object
{
        char fileName[50];
        id tagList;
}

- initFile:(char *)fn;
- addTag:(int)theTag type:(int)theType;
- removeTag:(int)theTag type:(int)theType;
- (char *)filename;
- (int)hasTag:(int)theTag type:(int)theType; /* Type specifies which category, for example type
might be "focus" */
- tagAt:(int)i;                              /*Returns the ith tag object */
- removeTagAt:(int)i;
- write:(NXTypedStream *)s;
- read:(NXTypedStream *)s;
- free;
@end
```

-35-

```
/* The application object handles loading the help and info nib file */ import <appkit/Application.h>

@interface IEApp:Application
{
    id  helpBrowser;
    id  helpPanel;
    id  helpView;
}

- help:sender;
- showHelpFile:sender;  // When a user clicks on a help category, this method brings up the
                        // associated textfile in the helpview @end
```

```
/* Handles functions of the phraseBuilder*/ import <objc/Object.h>

@interface PhraseController:Object
{
    id    wordBox;      /*Data entry field for phraseBuilder */
    id    phraseBox;    /*Display field of current phrase*/
    id    andButton;    /*Matrix of logical buttons on phrase Builder*/
    id    notSwitch;    /*Each word entered can be negated by the user
                          selecting the not switch
                        */
}

- addFirstWord:sender to:phrase; /* The first word entered for a phrase by the
                                    user is not preceded by a conjunction so it
                                    is handled seperately. All words are added
                                    to phrase. Sender can be queried for
                                    dictionary information to see if the word
                                    being entered is in the dictionary.
                                 */

- addWord:sender to:phrase;
- displayPhrase:phrase;          /* Updates the phrase being built in the
                                    phraseBox by adding the new word and its
                                    conjunction and redisplaying
                                 */

- enterPhrase:phrase with:dictionary :sender;  /* returns phrase */
- resetWordBox:sender;           /* Resets phraseBuilder and clears current
                                    phrase being built. Usually called is
                                    phrase is canceled by user or if the user
                                    has entered the phrase in the phraseList
                                    and is no longer adding to the current phrase
                                 */

@end
```

-37-

```
/* a Tag object consists of an integer specifying the position of the tag in the general info
window for a given type.  The types are 0=TYPE, 1=Age, 2=FOCUS of article, 3=TOPIC(s) or
article */ import <objc/Object.h>

@interface TagObject:Object
{
    int tag;
    float weight;/* In a phrase list a tag is alos associated with a
                    weighted value determined by the user
                 */
    int type;
}

- initWithTag:(int)i weight:(float)f type:(int)i2;
- setTag:(int)i;
- setType:(int)i;
- setWeight:(float)f;
- (int)tag;
- (int)type;
- (float)weight;
- write:(NXTypedStream *)s;
- read:(NXTypedStream *)s;

@end
```

```
/* A phrase word consists of a word ( a string made up of alphanumeric characters), a
conjunction such as and, or, and not, and or. */ import <objc/Object.h>

@interface Word:Object
{
    char *word;
    int length;
    int conj;
    int neg;
}

- init;
- (int)conjunction;
- (int)neg;
- (int)length;
- (char *)word;
- setWord:(const char *)theText;
- setConjunction:(int)conjunction;
- setNeg:(int)negation;
- write:(NXTypedStream *)s;
- read:(NXTypedStream *)s;
- free;
@end
```

-39-

What is claimed is:

1. A method of searching media articles particularly newspaper articles for reviewing the information content in said article and for categorizing the subject matter according to predetermined topics, comprising the steps of:

listing a series of topics under which said articles are classified according to desired information content, wherein said listing further includes age level information for individuals, storing said articles in a database, generating a series of keywords selected according to desired information, associating said keywords with at least one said predetermined topic and assigning a tag to the associated topic and keyword to form a tagged word, attaching a weighting factor to each generated said tag, providing a score indicating keywords present in said article in relation to said weighting factor and said tag, selecting those articles having the greatest score as related to said predetermined topic.

2. The method according to claim 1, further including the steps of displaying said selected articles and indications of relevant said tagged keywords.

3. The method according to claim 1, wherein said method employs an expert system having an inference engine which draws inferences based on a rule base and a knowledge base, said knowledge base including said database.

4. The method according to claim 3, wherein the steps of providing a score and selecting are implemented by said inference engine contained in said expert system.

5. The method according to claim 3, wherein the steps of listing, generating, associating, and attaching are implemented and stored in said rule base of said expert system.

6. The method according to claim 1, wherein said listing a series of topics includes the Type of article stored.

7. The method according to claim 6, wherein said type of article stored is listed in at least one of the following categories: editorial, straight news, featured stories of individuals, featured stories of organizations.

8. The method according to claim 1, further including the step of:

storing in a data dictionary an alphabetical listing of all keywords that have been generated according to said desired information.

9. The method according to claim 1, wherein the step of providing includes scanning each of said stored articles to determine presence of generated keywords indicating at least one predetermined topic.

10. The method according to claim 1, further including the step of:

forming phrases from at least two keywords, and selecting any articles containing said formed phrases.

11. The method according to claim 10, further comprising the step of:

storing all phrases formed from said keywords, and tagging said phrases with selected topics in said list, inferring that articles having one of said stored phrases also include said selected topics as tagged.

12. The method according to claim 1, further including the step of:

determining value for said tagged keywords and for at least one said associated topic indicating importance of said keywords in selected article and displaying that value for each selected article.

13. The method according to claim 1, wherein said weighting factor are selected from a value between 1 and 100, and means for adding said weighting factor to said keywords where said keywords with weighting factors lower than a given value will not be considered in said selection step.

14. A method of searching media articles particularly newspaper articles for reviewing the information content in said article and for categorizing the subject matter according to predetermined topics, comprising the steps of:

listing a series of topics under which said articles are classified according to desired information content, wherein said listing further includes focus information of said article regarding handicapped individuals, as those who are deaf, blind, emotionally disturbed, have learning disability, mentally retarded, orthopedically or visual handicapped, storing said articles in a database, generating a series of keywords selected according to desired information, associating said keywords with at least one said predetermined topic and assigning a tag to the associated topic and keyword to form a tagged word, attaching a weighting factor to each generated said tag, providing a score indicating keywords present in said article in relation to said weighting factor and said tag, selecting those articles having the greatest score as related to said predetermined topic.

15. A method of searching media articles particularly newspaper articles for reviewing the information content in said article and for categorizing the subject matter according to predetermined topics, comprising the steps of:

listing a series of topics under which said articles are classified according to desired information content, wherein said listing further includes article topics selected from the groups of handicap persons, accessibility to buildings, transportation, advertising, performing arts, education, medical treatment, counseling, sports, rehabilitation, technology, welfare, AIDS and taxes, storing said articles in a database, generating a series of keywords selected according to desired information, associating said keywords with at least one said predetermined topic and assigning a tag to the associated topic and keyword to form a tagged word, attaching a weighting factor to each generated said tag, providing a score indicating keywords present in said article in relation to said weighting factor and said tag, selecting those articles having the greatest score as related to said predetermined topic.

\* \* \* \* \*